UNITED STATES PATENT OFFICE.

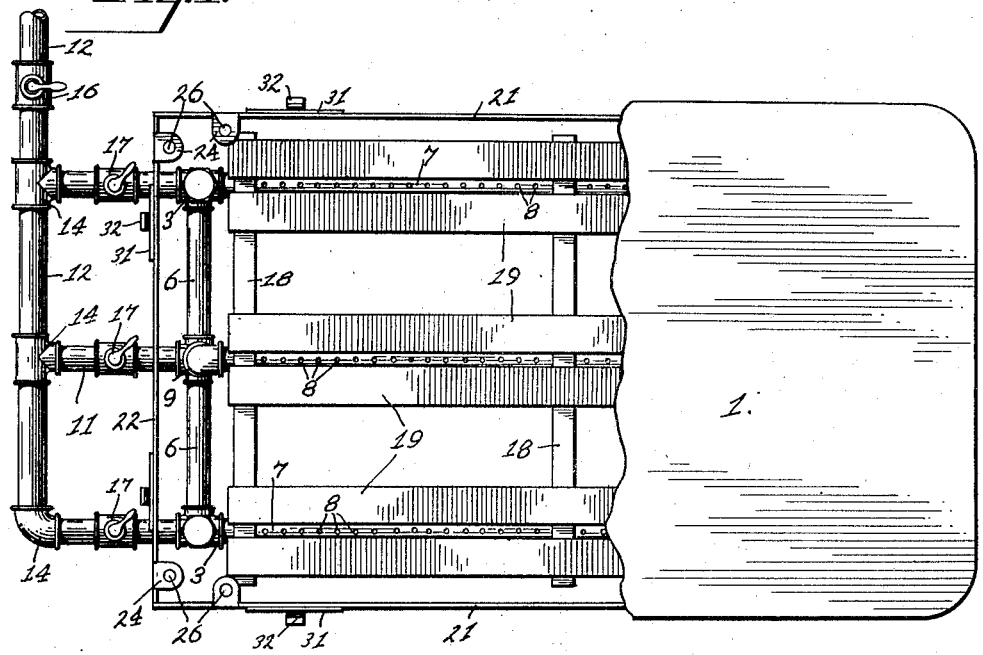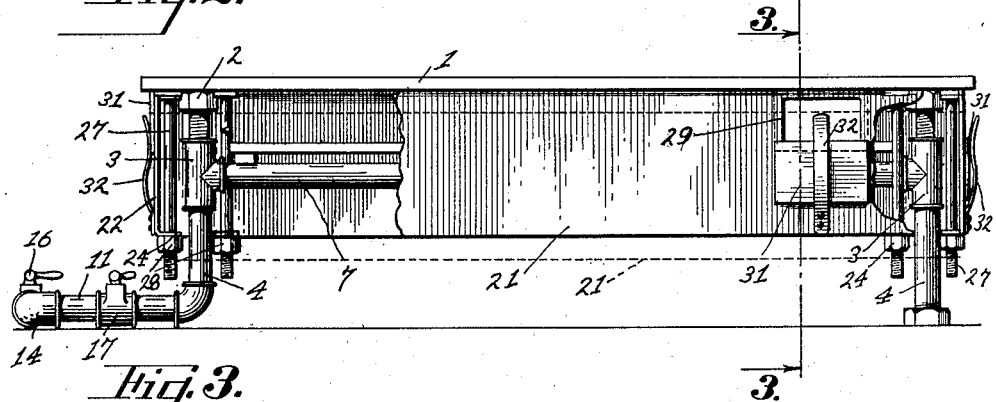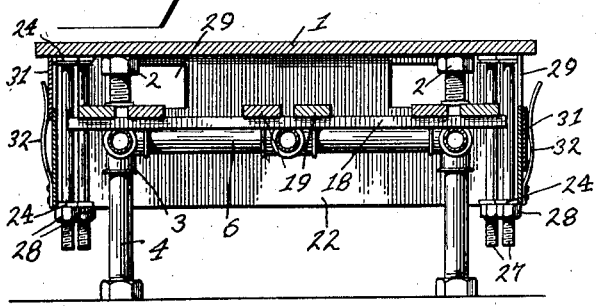

LEOPOLD DE MEUTTER, OF SAN FRANCISCO, CALIFORNIA.

GAS-PLATE.

1,395,097. Specification of Letters Patent. Patented Oct. 25, 1921.

Application filed July 21, 1920, Serial No. 397,982. Renewed August 29, 1921. Serial No. 496,752.

*To all whom it may concern:*

Be it known that I, LEOPOLD DE MEUTTER, a subject of Belgium, residing in the city and county of San Francisco and State of California, have invented a new and useful Improvement in a Gas-Plate, of which the following is a specification.

My invention relates to improvements in gas plates wherein a plurality of independently regulated apertured conduits operate in conjunction with baffles to deliver and evenly distribute a gaseous fuel for combustion with a regulated supply of air beneath a heating surface, and the objects of my invention are;

First, to provide improved means for distributing a gaseous fuel for combustion beneath a heating surface;

Second, to provide improved means for adjusting the supply of air to be admitted to support the combustion of gaseous fuel beneath a heating surface;

Third, to provide means for adjusting the supply of fuel and regulating the combustion thereof whereby a heating surface may be heated evenly or to varying degrees at different portions thereof as desired.

I accomplish these and other objects by means of the novel device disclosed in the drawings forming a part of the present specification wherein like characters of reference are used to designate similar parts throughout said specification and drawings and in which:

Figure 1 is a plan view of my improved gas plate, a portion of the heating surface being broken away to disclose the arrangement of conduits and baffles thereunder;

Fig. 2 is a broken side elevation of Fig. 1;

Fig. 3 is a cross sectional view taken along the line 3—3 of Fig. 2 in the direction indicated.

Referring to the drawings the numeral 1 is used to designate a heating surface supported adjacent the corners thereof upon machine bolts adjustably mounted in fittings 3 provided at the upper ends of supporting pipes 4 connected at the upper ends thereof by transverse braces 6 mounted within the fittings 3. Fuel conduits 7 provided with a plurality of apertures 8 extend longitudinally beneath the heating surface 1 and are secured at the ends thereof in the fittings 3 mounted upon the supporting pipes 4, a centrally disposed conduit 7 being provided and secured within fittings 9 provided in the transverse braces 6. One pair of supporting pipes 4 is connected at the lower end thereof with supply conduits 11 for delivering fuel therefrom to the fuel conduits 7, the central fuel conduit 7 being similarly connected to receive fuel from a similar supply conduit 11. A main supply conduit 12 is connected to the supply conduits 11 by fittings 14 for delivering gaseous fuel thereto from a source of supply not shown, a valve 16 being provided in said main supply conduit for regulating the amount of fuel supplied therefrom to the supply conduits 11. Adjusting valves 17 are provided in the supply conduits 11 for independently regulating the amount of fuel supplied to the fuel conduits 7.

Transverse baffle supporting bars 18 rest upon the fuel conduits 7 for supporting a plurality of baffle bars 19 arranged longitudinally in pairs in spaced relation above the fuel conduits 7 for distributing and causing a circulation of gaseous fuel for combustion thereabout.

Vertically disposed side plates 21 and end plates 22 having inwardly turned lugs 24 adjacent the ends at the top and bottom edge thereof are mounted adjacent the heating surface 1, said lugs 24 being provided with apertures 26 registering in corresponding upper and lower lugs and adapted to engage downwardly extending rods 27 secured to the heating surface 1 on the lower side thereof for slidably mounting said side plates 21 and end plates 22 thereon. The rods 27 are threaded at the lower end thereof to receive a nut 28 for adjustably retaining said side and end plates in the desired vertical relation with the heating surface 1. Apertures 29 are provided near the ends of the side plates 21 and the end plates 22 to provide means for admitting air above the baffles 19. Damper plates 31 are slidably mounted adjacent the apertures 29 for adjusting the amount of air to be admitted therethrough, said damper plates 31 being retained in engagement with the side plates 21 and end plates 22 by springs 32 secured thereto.

The slidably mounted side plates 21 and end plates 22 provide means of admitting air between the upper edge thereof and the heating surface 1, in variable amounts at different sides and ends for regulating the combustion of gas thereunder to meet varying requirements, the dampers 31 and apertures 29 forming additional regulating means adapted to meet varying conditions. In practice the gas delivered through the aperture fuel conduits 7 is deflected about the baffle bars 19 and circulated beneath the heating surface 1, air being admitted above said baffle bars 19 to cause a complete combustion thereof in direct contact with the heating surface. The independent adjusting valves 17 provided in the supply conduits provide means for regulating the supply of fuel delivered to the fuel conduits to obtain evenness of heat at all parts of the heating surface 1, or to cause an inequality of heating affording a hotter surface at one side than at the other. The bolts 2 are provided for adjusting the level of the heating surface. The transverse braces 6 are made blind to prevent the passage of gas therethrough from one fuel conduit to another, the supporting pipes 4 also being made blind to prevent escape of gas therethrough.

Having thus described my invention what I claim as new and desire to secure by Letters Patent is:

1. A gas plate comprising a heating surface; apertured fuel conduits mounted thereunder; baffles mounted above said fuel conduits to distribute fuel delivered therefrom evenly beneath the heating surface for combustion; side plates and end plates mounted in adjustable spaced relation to said heating surface and adapted to surround said conduits and baffles for admitting air there above; and means for adjusting each of said side and end plates independently, to provide greater or less space between said plates and said heating surface.

2. A gas plate comprising a heating surface; apertured fuel conduits mounted thereunder; baffles mounted above said fuel conduits to distribute fuel delivered therefrom evenly beneath the heating surface for combustion; side plates and end plates mounted in adjustable spaced relation to said heating surface and adapted to surround said conduits and baffles for admitting air there above; means for adjusting each of said side and end plates independently, to provide greater or less space between said plates and said heating surface; and dampers adapted to operate in conjunction with air supply apertures provided in said side and end plates to regulate the supply of air therethrough.

3. A gas plate comprising a heating surface; apertured fuel conduits mounted thereunder; baffles mounted above said fuel conduits to distribute fuel delivered therefrom evenly beneath the heating surface for combustion; side plates and end plates mounted in adjustable spaced relation to said heating surface and adapted to surround said conduits and baffles for admitting air there above; and means for adjusting each of said side and end plates independently, to provide greater or less space between said plates and said heating surface; and dampers slidably mounted adjacent air supply apertures provided in said side and end plates and adapted to register therewith to regulate the supply of air therethrough.

4. A gas plate comprising a heating surface; a plurality of apertured fuel conduits mounted thereunder; a supply conduit supplying gaseous fuel to said apertured fuel conduits; means for regulating the amount of fuel supplied to said fuel conduits; baffles mounted above said fuel conduits to distribute fuel delivered therefrom equally beneath the heating surface; side plates and end plates mounted adjacent said heating surface and adapted to surround said conduits; means for adjusting each of said side and end plates independently to provide greater or less space between said plates and the heating surface; and dampers slidably mounted adjacent air supply apertures provided in said side and end plates and adapted to register therewith to regulate a supply of air therethrough.

5. A gas plate comprising a heating surface; a plurality of apertured fuel conduits mounted thereunder; a supply conduit supplying gaseous fuel to said apertured fuel conduits; means for regulating the amount of fuel supplied to said fuel conduits; means for regulating the supply of fuel delivered by each of said conduits; baffles mounted above said fuel conduits to distribute fuel delivered therefrom equally beneath the heating surface; side plates and end plates mounted adjacent said heating surface and adapted to surround said conduits; means for adjusting each of said side and end plates independently to provide greater or less space between said plates and the heating surface; and dampers slidably mounted adjacent air supply apertures provided in said side and end plates and adapted to register therewith to regulate a supply of air therethrough.

6. A gas plate comprising a heating surface; a plurality of apertured fuel conduits mounted thereunder; a supply conduit supplying gaseous fuel to said apertured fuel conduits; means for regulating the amount of fuel supplied to said fuel conduits; means for regulating the supply of fuel delivered by each of said conduits; baffles mounted above said fuel conduits to distribute fuel delivered therefrom equally beneath the heating surface; side plates and end plates mounted adjacent said heating surface and adapted to surround said conduits; means for adjusting each of said side and end plates independently to provide greater or less space between said plates and the heating surface; and dampers slidably mounted adjacent air supply apertures provided in said side and end plates and adapted to register therewith to regulate a supply of air therethrough; and means for adjusting the level of the heating surface.

In witness whereof I hereunto set my signature.

LEOPOLD DE MEUTTER.